(12) United States Patent
Yacobucci et al.

(10) Patent No.: US 9,347,478 B2
(45) Date of Patent: May 24, 2016

(54) WEAR PLATE ASSEMBLY

(71) Applicant: Kennametal Inc., Latrobe, PA (US)

(72) Inventors: Nathaniel J. Yacobucci, Latrobe, PA (US); Paul A. Bookhamer, Altoona, PA (US)

(73) Assignee: KENNAMETAL INC., Latrobe, PA (US)

( * ) Notice: Subject to any disclaimer, the term of this patent is extended or adjusted under 35 U.S.C. 154(b) by 30 days.

(21) Appl. No.: 14/018,470

(22) Filed: Sep. 5, 2013

(65) Prior Publication Data

US 2015/0063904 A1     Mar. 5, 2015

(51) Int. Cl.
| | |
|---|---|
| B25G 3/18 | (2006.01) |
| F16B 21/00 | (2006.01) |
| F16D 1/00 | (2006.01) |
| F16B 21/08 | (2006.01) |
| B02C 2/00 | (2006.01) |
| B02C 4/30 | (2006.01) |
| B02C 17/22 | (2006.01) |

(52) U.S. Cl.
CPC .................. *F16B 21/08* (2013.01); *B02C 2/005* (2013.01); *B02C 4/305* (2013.01); *B02C 17/22* (2013.01); *B02C 2210/02* (2013.01); *F16B 21/086* (2013.01); *Y10T 403/602* (2015.01)

(58) Field of Classification Search
CPC ............... Y10T 403/32827; Y10T 403/32991; Y10T 403/4622; Y10T 403/599; Y10T 403/602; Y10T 403/7037; Y10T 403/75; F16M 11/04; F16M 13/02; B02C 2/005; B02C 2210/02; B02C 4/305; B02C 17/22; F16B 21/08; F16B 21/086

USPC ......... 403/146, 166, 238, 240, 325, 327, 360, 403/408.1; 248/220.21, 222.11, 224.8, 248/346.01, 346.03
See application file for complete search history.

(56) References Cited

U.S. PATENT DOCUMENTS

| | | | | |
|---|---|---|---|---|
| 2,230,916 | A | * | 2/1941 | Tinnerman .................... 411/525 |
| 3,606,406 | A | * | 9/1971 | Walters ......................... 403/240 |
| 4,697,780 | A | * | 10/1987 | Wenkman et al. ............ 248/558 |
| 4,755,003 | A | | 7/1988 | Pinkerton et al. |
| 4,848,089 | A | * | 7/1989 | Cramer ........................... 60/752 |
| 5,201,799 | A | * | 4/1993 | Johnson .......................... 60/800 |
| 5,265,411 | A | * | 11/1993 | Belsom .......................... 60/796 |
| 5,417,530 | A | * | 5/1995 | Grossner ....................... 411/258 |
| 5,628,549 | A | | 5/1997 | Ritchey et al. |
| 2011/0174353 | A1 | * | 7/2011 | Urban et al. .................. 136/244 |
| 2013/0048056 | A1 | * | 2/2013 | Kilgore et al. ................ 136/251 |
| 2013/0240008 | A1 | * | 9/2013 | Baker ........................... 136/244 |

* cited by examiner

*Primary Examiner* — Daniel P Stodola
*Assistant Examiner* — Nahid Amiri
(74) *Attorney, Agent, or Firm* — Larry R. Meenan

(57) ABSTRACT

A wear plate assembly for mounting on a substrate to be protected includes a support plate having a first surface and an opposing second surface and a wear plate having a wear surface and an opposing attachment surface affixed to the first surface of the support plate, wherein the wear surface is a continuous, uninterrupted surface. The assembly also includes a shaft having a base portion attached to the second surface of the support plate, a head portion distal from the base portion and a groove formed between the base portion and the head portion. The assembly also includes a retainer spring adapted to be received in the groove on the shaft, wherein the retainer spring includes a plurality of compressible tabs configured for cooperating with the substrate to releasably attach the wear plate assembly to the substrate.

13 Claims, 5 Drawing Sheets

WEAR PLATE ASSEMBLY

BACKGROUND OF THE INVENTION

The invention is directed to a wear plate assembly and, more particularly is directed to a quick disconnect wear plate assembly.

There are certain instances in which wearing members (e.g. members such as crushing rolls or digging teeth, such as are found on buckets, or chutes, etc.) can be made more wear or corrosion resistant or hard by covering or plating the base material that forms the member with a more wear resistant material. For example, wear plates/tiles can be attached to the base material that forms the member.

Thus, it will be appreciated that wear plates/tiles are used to minimize downtime in severe wear applications. One known example is wear plates/tiles that utilize bolt-on solutions. In this type of arrangement, counter-sunk bolt heads are used to attach the wear plate/tile to the wearing member and the bolt heads are exposed at the wear surface and become difficult to remove in the field after the life of the wear plate/tile.

It would be desirable to have an improved wear plate/tile arrangement that overcomes the problems, disadvantages or shortcomings of known such arrangements.

SUMMARY OF THE INVENTION

A quick disconnect wear plate assembly for mounting on a substrate to be protected, the quick disconnect wear plate including a support plate having a first surface and an opposing second surface and a wear plate having a wear surface and an opposing attachment surface affixed to the first surface of the support plate, wherein the wear surface is a continuous, uninterrupted surface. The assembly also includes a shaft having a base portion attached to the second surface of the support plate, a head portion distal from the base portion and a groove formed between the base portion and the head portion. The assembly also includes a retainer spring adapted to be received in the groove on the shaft, wherein the retainer spring includes a plurality of compressible tabs configured for cooperating with the substrate to releasably attach the quick disconnect wear plate assembly to the substrate.

A wear plate assembly for mounting on a substrate to be protected, the wear plate assembly including: a support plate having a first surface and an opposing second surface; a wear plate positioned on the first surface of the support plate; a shaft extending from the second surface of the support plate; and a retainer spring adapted to be mounted on the shaft, wherein the retainer spring is configured to releasably attach the wear plate assembly to the substrate.

A quick disconnect wear plate assembly for mounting on a substrate to be protected, the quick disconnect wear plate including a support plate having a first surface and an opposing second surface and a wear plate having a wear surface and an opposing attachment surface affixed to the first surface of the support plate, wherein the wear surface is a continuous, uninterrupted surface. The assembly further includes means for releasably attaching to the substrate the support plate with the wear plate affixed thereto.

BRIEF DESCRIPTION OF THE DRAWINGS

The above, as well as other features and advantages of the invention, will become apparent upon consideration of the detailed description in connection with the drawings in which.

DETAILED DESCRIPTION

Referring to FIGS. 1-7, there is illustrated a wear plate assembly 10 for mounting or attaching on a substrate 12 to be protected and/or reduce wear or corrosion of the substrate 12, in accordance with an aspect of the invention. The wear plate assembly 10 may also be generally referred to as a wear tile assembly, protective cover assembly or the like. The wear plate assembly 10 may also be generally referred to as a quick disconnect wear plate assembly in view of the ability to quickly install, disconnect, replace, etc. the wear plate assembly, as will be appreciated from the description set forth herein.

Figure 1:
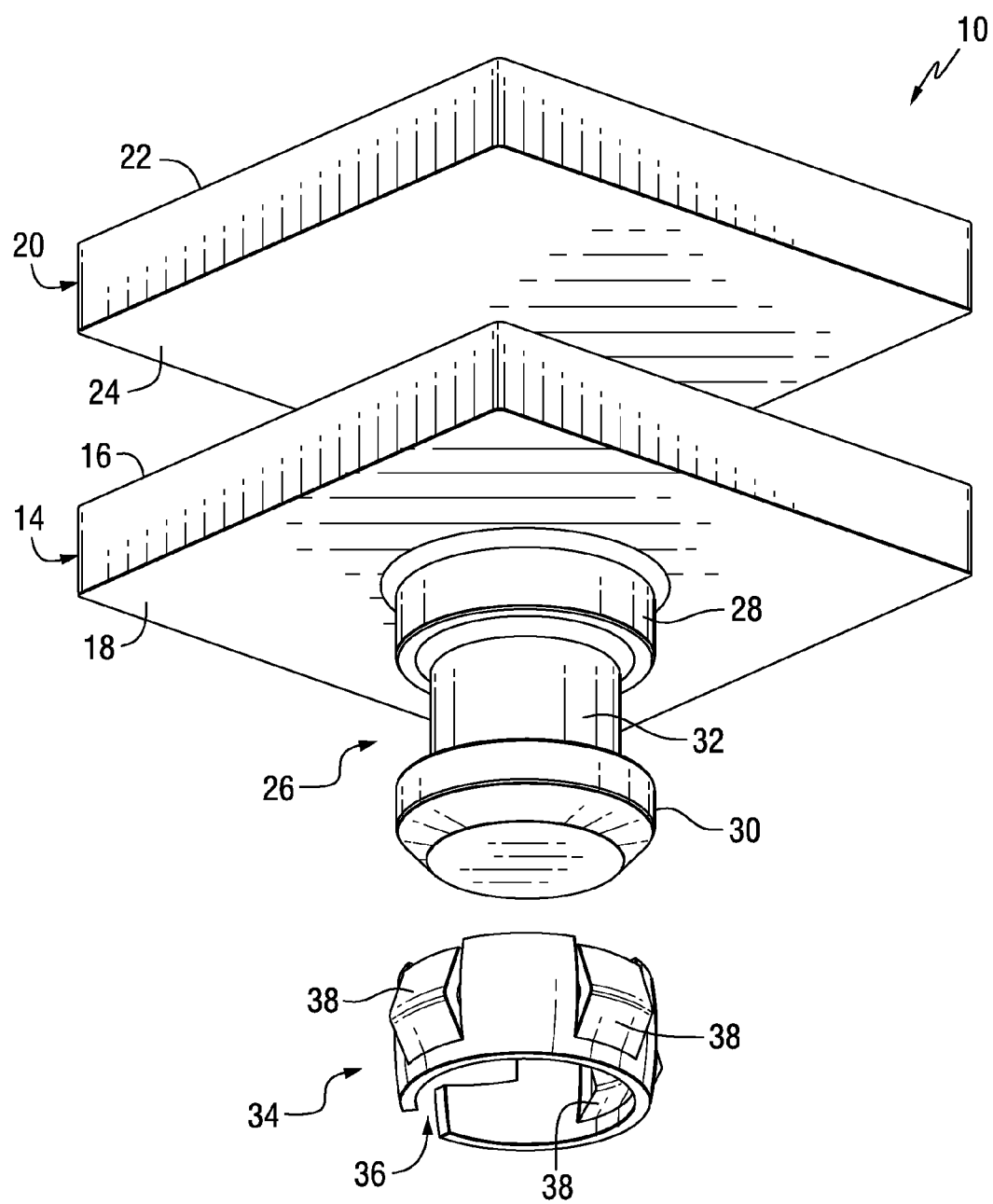
FIG. 1 is an exploded isometric view of a wear plate assembly, in accordance with an aspect of the invention.
Figure 2:
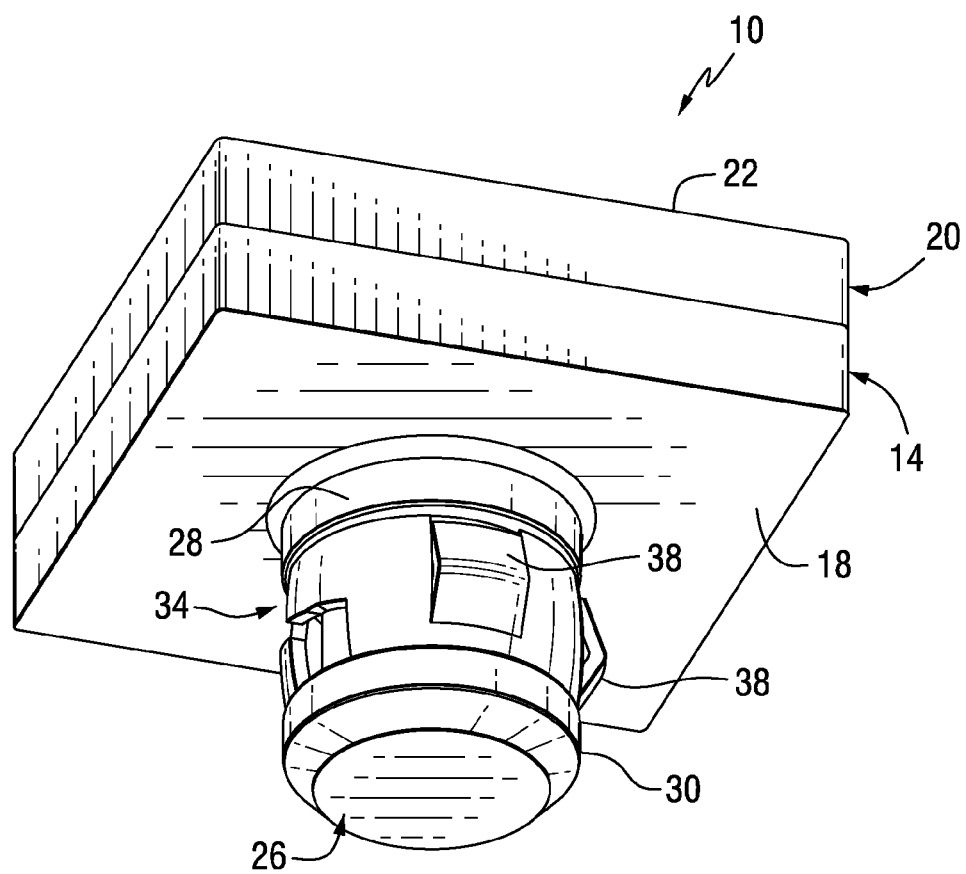
FIG. 2 is an isometric view of the wear plate assembly shown in FIG. 1 as assembled, in accordance with an aspect of the invention.
Figure 3A:
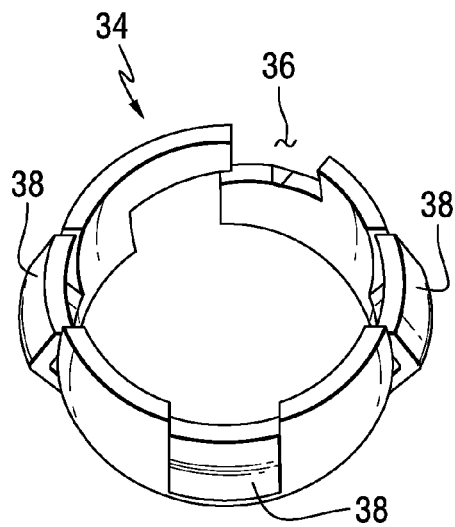
FIGS. 3A-3D are various views of the retainer ring shown in FIGS. 1 and 2, in accordance with an aspect of the invention.
Figure 3C:
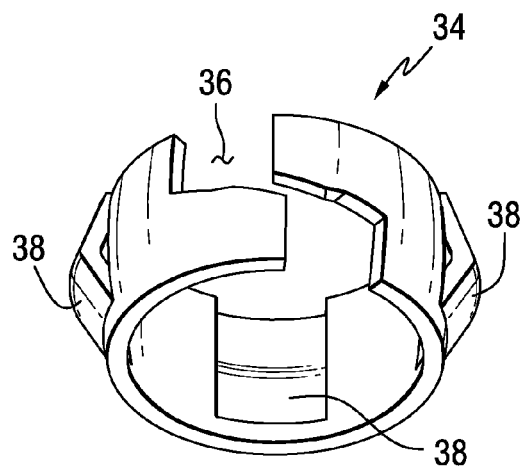
Figure 3B:
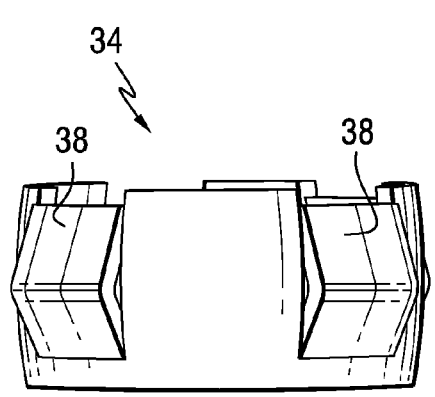
Figure 3D:
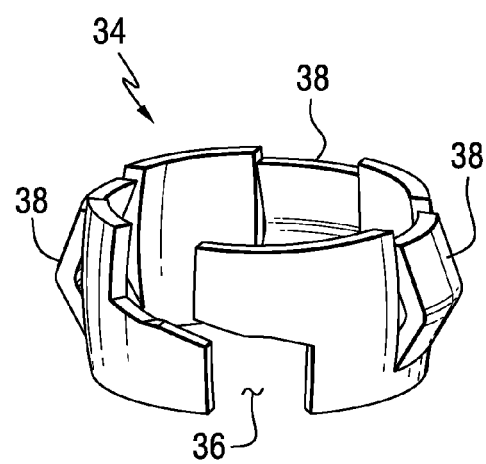
Figure 4:
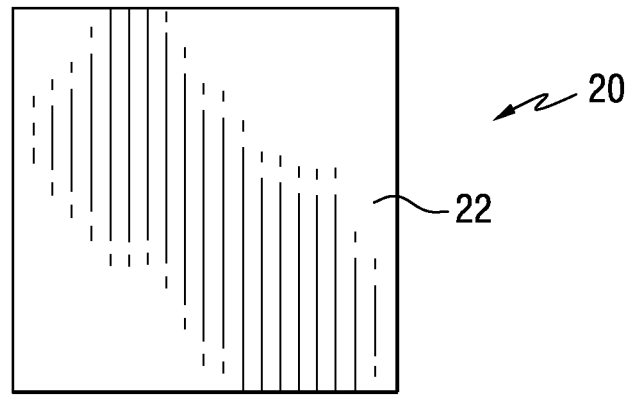
FIG. 4 is a view of a wear surface of the wear plate shown in FIGS. 1 and 2, in accordance with an aspect of the invention.
Figure 5:
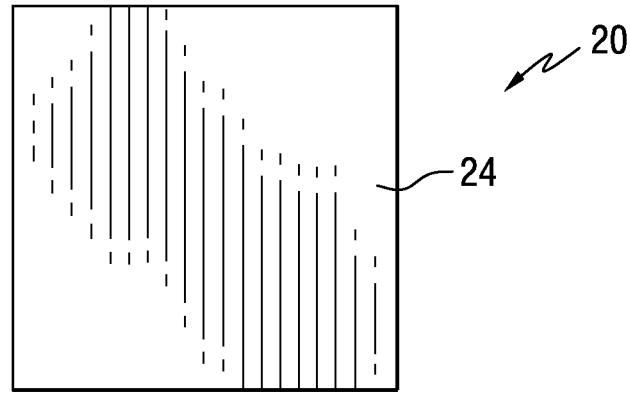
FIG. 5 is a view of an attachment surface of the wear plate shown in FIGS. 1 and 2, in accordance with an aspect of the invention.
Figure 6:
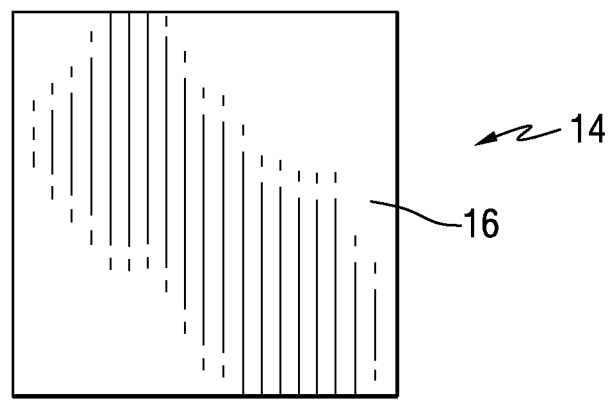
FIG. 6 is a view of a first surface of the support plate shown in FIGS. 1 and 2, in accordance with an aspect of the invention.

Referring to FIGS. 1-2, the wear plate assembly 10 includes a support plate 14 having a first surface 16 and an opposing second surface 18. The wear plate assembly 10 also includes a wear plate 20 having a wear surface 22 and an opposing attachment surface 24. The attachment surface 24 is positioned on the first surface 16 of the support plate. In one aspect, the attachment surface 24 is affixed or secured to the first surface 16 of the support plate 14 by for example, brazing, welding, soldering, epoxy, adhesive and/or an infiltrated mechanical fastener. It will be appreciated that the wear plate 20 may also be generally referred to as a wear tile, protective plate or tile or the like. It will also be appreciated that the surfaces 16, 18, 22 and 24 may also be generally referred to as sides, portions or the like.

The wear plate assembly 10 also includes a shaft 26 having a base portion 28 attached, secured or affixed to the second surface 18 of the support plate 14, a head portion 30 distal from the base portion 28 and a groove 32 formed between the base portion 28 and the head portion 30. In one aspect, the base portion 28 may be integrally formed with the shaft 26 to make a single, unitary component. In another aspect, the shaft 26 extends from the second surface 18 of the support plate 14.

Referring to FIGS. 1-3D, the assembly 10 further includes a retainer spring 34 configured or adapted to be received or mounted in the groove 32 on the shaft 26. In one aspect, the retainer spring 34 is generally circular. In another aspect, the retainer spring 34 is formed of a resilient material and includes a space or notch 36 configured to allow for the retainer spring to expand and retract for mounting in the groove 32 and for removing from the groove 32. In another aspect, the retainer spring 34 includes a plurality of compressible tabs 38 configured for cooperating with the substrate 12 to releasably attach the wear plate assembly 10 to the substrate 12. In another aspect, the compressible tabs 38 are spaced apart about a periphery of the retainer spring 34. In one example, three compressible tabs 38 are provided on the retainer spring 34. Thus, it will be appreciated that the shaft 26 and retainer spring 34 provide one example of a means for releasably attaching to the substrate 12 the support plate 14 with the wear plate 20 affixed thereto.

In accordance with another aspect of the invention, the wear plate 20 is solid, i.e. no holes, bores, etc. formed therein or extending therethrough. In one aspect, the wear surface 22 is a continuous, uninterrupted surface (see, for example, FIG. 4). The attachment surface 24 can also be a continuous, uninterrupted surface (see, for example, FIG. 5). The first surface 16 of the support plate 14 can also be a continuous, uninterrupted surface (see, for example, FIG. 6). In another aspect, the wear surface 22 is a planar surface. The attachment surface 24 can also be a planar surface. The first surface 16 of the support plate 14 can also be a planar surface.

In accordance with another aspect of the invention, the wear plate 20 and the support plate 14 can be formed to have substantially the same size, shape and/or configuration. In another aspect of the invention, the wear plate 20 and the support plate 14 can be formed to have various sizes, shapes and/or configurations. In one example, the wear plate 20 and the support plate 14 can be substantially square as illustrated, but it will be appreciated that other shapes such as triangular, octagonal, trapezoidal, etc. can be formed.

In accordance with another aspect of the invention, the wear plate 20 can have a greater wear resistance than the support plate 14. This can be accomplished by material choices for the wear plate 20 that are harder and/or more wear resistant than the material for the support plate 14. In one aspect, the wear plate 20 can be formed of, for example, but not limited to, cemented (cobalt) tungsten carbide, polycrystalline diamond (PCD), polycrystalline cubic boron nitride (PCBN), steel, ceramic, Super-C™, Super-X™ KenCast™ or Conforma Clad™. In another aspect, the support plate 14 can be formed of, for example, but not limited to, steel, cemented (cobalt) tungsten carbide, hard rubber, thermosetting plastics or aluminum. Similarly, the wear plate 20 can have a greater wear resistance than the substrate 12 material to provide wear protection to the substrate 12.

Figure 7:
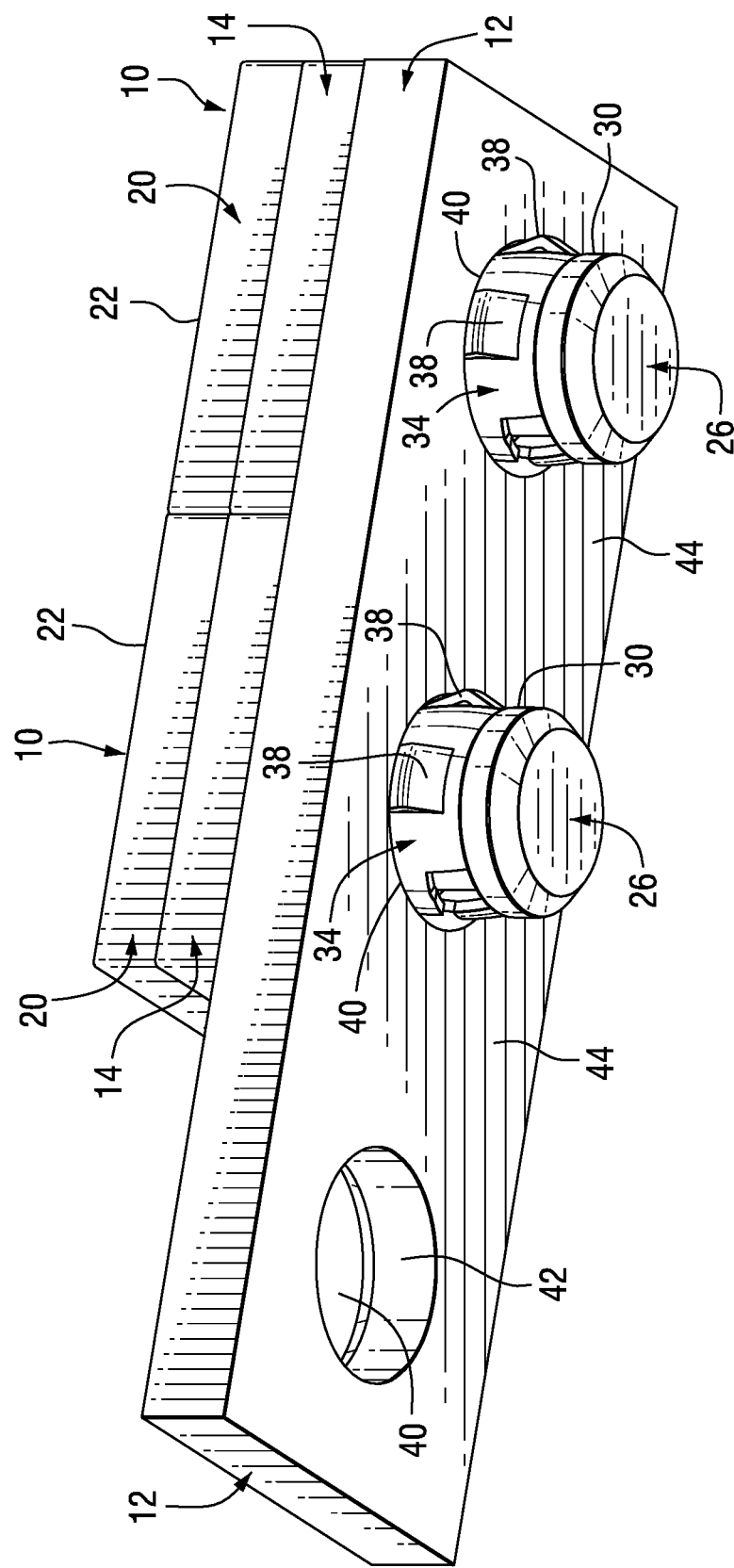
FIG. 7 is an isometric view of the wear plate assembly shown in FIGS. 1 and 2 as mounted on a substrate, in accordance with an aspect of the invention.

FIG. 7 illustrates a pair of wear plate assemblies 10 attached to the substrate 12. The substrate 12 can be any wearing member for which it is desired to protect and provide wear resistance or corrosion resistance. The substrate 12 can be, for example, but not limited to, crushing rolls, digging teeth (such as are found on buckets), chutes, hoppers, conveyors, liners, etc.

Specifically, the substrate 12 can include mounting apertures 40 through which the shaft 26 with retainer spring 34 is inserted. The compressible tabs 38 are compressed radially inwardly by the sidewall 42 of the aperture 40 as they pass through the aperture 40. The compressible tabs 38 then expand radially outwardly once passing through the aperture 40 and engage the bottom surface 44 and/or the sidewall 42 of the substrate 12 to secure the assembly 10 thereto. It will be appreciated that other means for securing the retainer spring 34 to the substrate may be utilized in accordance with aspects of the invention such as, for example, but not limited to, providing a groove in the surface 44 for the tabs 38 to engage.

To quickly disconnect the wear plate assembly 10 from the substrate 12, the compressible tabs can be compressed radially inwardly to disengage from the bottom surface 44 of the substrate 12 and then the wear plate assembly 10, and more specifically the shaft 26 with retainer spring 34 can be pulled and/or pushed through the aperture 40 to be removed from the substrate 12. Alternatively, the retainer spring 34 can be removed from the groove 32 to easily allow the shaft to pass through the aperture 40.

While specific embodiments and aspects of the invention have been described in detail, it will be appreciated by those skilled in the art that various modifications and alternatives to those details could be developed in light of the overall teachings of the disclosure. The embodiments and aspects described herein are meant to be illustrative only and not limiting as to the scope of the invention which is to be given the full breadth of the appended claims and any and all equivalents thereof.

What is claimed is:

1. A quick disconnect wear plate assembly for mounting on a substrate to be protected, the quick disconnect wear plate assembly comprising:
   a support plate having a first surface and an opposing second surface;
   a wear plate having a wear surface and an opposing attachment surface affixed to the first surface of the support plate, wherein the wear surface is a continuous, uninterrupted surface;
   a shaft having a base portion attached to the second surface of the support plate, a head portion distal from the base portion and a groove formed between the base portion and the head portion; and
   a retainer spring adapted to be removably mounted in the groove on the shaft, wherein the retainer spring includes a plurality of compressible tabs compressed radially inwardly to disengage from a bottom surface of the substrate and configured for releasably engaging the substrate to releasably attach the quick disconnect wear plate assembly to the substrate.

2. The quick disconnect wear plate assembly of claim 1, wherein the wear plate is solid.

3. The quick disconnect wear plate assembly of claim 2, wherein the wear surface of the wear plate is a planar surface.

4. The quick disconnect wear plate assembly of claim 3, wherein the compressible tabs are spaced apart about a periphery of the retainer spring.

5. The quick disconnect wear plate assembly of claim 4, wherein the wear plate has a greater wear resistance than the support plate.

6. A wear plate assembly for mounting on a substrate to be protected, the wear plate assembly comprising:
   a support plate having a first surface and an opposing second surface;
   a wear plate positioned on the first surface of the support plate;
   a shaft extending from the second surface of the support plate, the shaft having a base portion attached to the second surface of the support plate, a head portion distal from the base portion and a groove formed between the base portion and the head portion; and
   a retainer spring adapted to be removably mounted on the shaft, wherein the retainer spring includes a plurality of compressible tabs compressed radially inwardly to disengage from a bottom surface of the substrate and configured for releasably engaging the substrate to releasably attach the wear plate assembly to the substrate.

7. The wear plate assembly of claim 6, wherein the wear plate includes a wear surface and an opposing attachment surface positioned on the first surface of the support plate.

8. The quick disconnect wear plate assembly of claim 7, wherein the wear plate is solid.

9. The wear plate assembly of claim 7, wherein the wear surface of the wear plate is a planar surface.

10. The wear plate assembly of claim 9, wherein the wear surface of the wear plate is a continuous, uninterrupted surface.

11. The wear plate assembly of claim 6, wherein the wear plate is affixed to the support plate.

12. The wear plate assembly of claim 6, wherein the compressible tabs are spaced apart about a periphery of the retainer spring.

13. The wear plate assembly of claim 6, wherein the wear plate has a greater wear resistance than the support plate.

* * * * *